3,243,482
SURFACE-ACTIVE THIOPHOSPHORIC ACID ESTERS OF POLYGLYCOL ETHERS
Harry Kaplan, Westfield, Leslie G. Nunn, Jr., Metuchen, and Robert C. Wilson, Cranford, N.J., assignors to General Aniline & Film Corporation, New York, N.Y., a corporation of Delaware
No Drawing. Filed Jan. 10, 1962, Ser. No. 165,299
2 Claims. (Cl. 260—950)

This invention relates to novel anionic surface-active compositions having highly advaneageous surface-active properties, and to a process for their preparation.

The surface-active compositions of this invention are anionic thiophosphoric acid esters of nonionic surface-active compounds which are condensation products of organic compounds having at least one reactive hydrogen atom with at least 1 molecular equivalent of an alkylene oxide.

More particularly, compositions of the invention are thiophosphoric acid esters in which the acid is partly esterified with a nonionic surface-active condensation product of from 1 to 150 mols of an alkylene oxide of 2 to 4 carbon atoms with an organic compound of 6 to 43 carbon atoms having at least one reactive hydrogen atom—especially an alcoholic or phenolic-hydroxyl or thiol group, a carboxyl group, a primary or secondary amino-group or an imino group, included in a heterocyclic ring, or a carboxyamido or sulfonamide group having at least one hydrogen atom attached to the amide nitrogen.

Preparation of the anionic surface-active ester compositions in accordance with the invention involves gradual addition of 1 mol of $P_2S_5$ to 1 to 4 mols of the nonionicsurface-active condensation product in liquid (i.e. molten, if normally solid) condition. The mixture is maintained advantageously at elevated temperature and is preferably agitated vigorously during addition of the $P_2S_5$, and thereafter until reaction is complete. While the reaction is largely complete when all the $P_2S_5$ has been added, agitation of the mixture is advantageously continued thereafter at the reaction temperature for a short period to insure completion of the reaction. The mixture is then allowed to cool, and is discharged.

The compositions produced in accordance with this invention consists primarily of esters of mono- and di-thiophosphoric acids, the esterification thereof being incomplete so that an average of at least 1 monovalent acidic salt-forming group remains for each phosphorus atom. They contain the radicals of not more than 2, and generally from ½ to 2 stoichiometric equivalents of the esterified nonionic surface-active compound per atomic equivalent of phosphorus. The compositions may also contain minor residues of unesterified nonionic surfactant to the extent reaction of the latter with $P_2S_5$ is incomplete.

The acidic thiophosphoric acid esters of the resulting compositions can be partly or completely neutralized if desired to form corresponding salts. Thus, for example, the compositions can be converted to alkali or alkaline earth metal salts (e.g. Na, K, Li, Ca, Sr, Ba or Mg salts) to salts of mono- and di-valent heavy metals (e.g. Fe, Sn, Cd, Mn, Hg, Ni, Ag or Zn salts) or to salts of trivalent metals (e.g. Al, Fe, Cr or Sb), or to salts of ammonia or organic nitrogen bases (e.g. aliphatic, aromatic or heterocyclic amines such as mono-, di- or tri-methyl-, ethyl-, lauryl-, ethanol-, propanol-, butanol-, hexanol-, cyclohexyl-, phenyl-, pyridyl-, or morpholinyl-amines, or heterocyclic nitrogen bases such as piperidine, pyridine or morpholine).

The acid thiophosphoric esters as well as their salts have outstanding soap-like properties in aqueous solution, including high dispersing and emulsifying power, stability to precipitate in hard water, and lower acidity than corresponding acid sulphuric acid esters.

The invention will be more fully understood from the following examples which illustrate but are not intended to limit the invention. Parts and percentages are by weight unless otherwise indicated.

*Example 1*

22.2 parts (0.1 mol part) of $P_2S_5$ are gradually added over a period of about 45 minutes to 123.2 parts (0.2 mol part) of nonylphenyl-polyethylene-glycol monoether having the formula

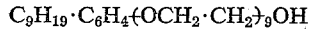
$$C_9H_{19} \cdot C_6H_4(OCH_2 \cdot CH_2)_9OH$$

obtained by condensing 9 mols of ethyleneoxide with 1 mol of nonylphenol. The nonylphenyl-polyethylene-glycol monoether is pre-heated to 80° C. and vigorously agitated during the addition of $P_2S_5$. The reaction is exothermic and the temperature of the mixture is maintained by appropriate cooling or heating within the range 80–100° C. When the addition of $P_2S_5$ is complete, agitation is continued at about 80° C. for two hours. The mixture is then allowed to cool. A light-colored viscous liquid is obtained which is soluble in water, and possesses in aqueous solution excellent dispersing and emulsifying power while being stable to precipitation with hard water. The composition contains 4.36% phosphorus and 9.0% sulphur, part of the sulphur originally contained in the added $P_2S_5$ being evolved during the reaction as $H_2S$. The composition can be neutralized e.g. by addition of causitc soda or triethanolamine, preferably after dilution with ethanol, whereby a neutral salt is obtained having surface-active properties similar to those of the acidic ester composition.

*Example 2*

A series of surface-active agents obtained by condensing ethyleneoxide, propyleneoxide or butyleneoxide with various organic compounds having a reactive hydrogen atom, were esterified by addition of $P_2S_5$ in proportions ranging from 0.25 to 1 molecular equivalent thereof per mol of nonionic surface-active agent, following the procedure employed in the preceding example. The acidic thiophosphoric ester compositions thus obtained were analyzed for phosphorus and sulphur. The reagents employed, their proportions and the phosphorus and sulphur content of the resulting product are shown in the following table:

| Nonionic Surfactants | | Molar Ratio, Surfactant/$P_2S_5$ | Percent P | Percent S |
|---|---|---|---|---|
| Components | Formula | | | |
| Phenol +2 Butyleneoxide | $C_6H_5(OC_4H_8)_2OH$ | 4:1 | 5.4 | 11.2 |
| Octylphenol +9 Ethyleneoxide | $C_8H_{17}C_6H_4(OC_2H_4)_9OH$ | 3:1 | 3.1 | 6.4 |
| Nonylphenol +1 Ethyleneoxide | $C_9H_{19}C_6H_4OC_2H_4OH$ | 3:1 | 6.3 | 13.0 |
| Nonylphenol +4 Ethyleneoxide | $C_9H_{19}C_6H_4(OC_2H_4)_4OH$ | 2:1 | 6.3 | 13.0 |
| Nonylphenol +6 Ethyleneoxide | $C_9H_{19}C_6H_4(OC_2H_4)_6OH$ | 1:1 | 9.2 | 19.0 |
| Nonylphenol +15 Ethyleneoxide | $C_9H_{19}C_6H_4(OC_2H_4)_{15}OH$ | 4:1 | 1.64 | 3.4 |
| Nonylphenol +30 Ethyleneoxide | $C_9H_{19}C_6H_4(OC_2H_4)_{30}OH$ | 1:1 | 3.6 | 7.4 |
| Nonylphenol +50 Ethyleneoxide | $C_9H_{19}C_6H_4(OC_2H_4)_{50}OH$ | 2:1 | 1.03 | 2.12 |
| Nonylphenol +100 Ethyleneoxide | $C_9H_{19}C_6H_4(OC_2H_4)_{100}OH$ | 2:1 | 0.66 | 1.36 |
| Nonylphenol +150 Ethyleneoxide | $C_9H_{19}C_6H_4(OC_2H_4)_{150}OH$ | 4:1 | .23 | .47 |
| Nonylcresol +10 Ethyleneoxide | $C_9H_{19}(CH_3)C_6H_3(OC_2H_4)_{10}OH$ | 3:1 | 2.8 | 5.8 |
| Diamylphenol +8 Ethyleneoxide | $(C_5H_{11})_2C_6H_3(OC_2H_4)_8OH$ | 4:1 | 2.6 | 5.3 |
| Dinonylphenol +7 Ethyleneoxide | $(C_9H_{19})_2C_6H_3(OC_2H_4)_7OH$ | 2:1 | 4.2 | 8.6 |
| Didodecylphenol +18 Ethyleneoxide | $(C_{12}H_{25})_2C_6H_3(OC_2H_4)_{18}OH$ | 1:1 | 4.4 | 9.1 |
| Tridodecylphenol +10 Ethyleneoxide | $(C_{12}H_{25})_3C_6H_2(OC_2H_4)_{10}OH$ | 3:1 | 1.9 | 3.9 |
| Dioctadecylphenol +20 Ethyleneoxide | $(C_{18}H_{37})_2C_6H_3(OC_2H_4)_{20}OH$ | 4:1 | 1.0 | 2.1 |
| Hexylalcohol +2 Propyleneoxide | $C_6H_{13}(OC_3H_6)_2OH$ | 2:1 | 9.9 | 20.4 |
| Laurylalcohol +4 Ethyleneoxide | $C_{12}H_{25}(OC_2H_4)_4OH$ | 4:1 | 3.8 | 7.8 |
| Tridecylalcohol +10 Ethyleneoxide | $C_{13}H_{27}(OC_2H_4)_{10}OH$ | 4:1 | 2.3 | 4.7 |
| Stearyl alcohol +20 Ethyleneoxide | $C_{18}H_{37}(OC_2H_4)_{20}OH$ | 4:1 | 1.3 | 2.7 |
| Docosanol +30 Ethyleneoxide | $C_{22}H_{45}(OC_2H_4)_{30}OH$ | 2:1 | 1.8 | 3.7 |
| Dodecylmercaptan +6 Ethyleneoxide | $C_{12}H_{25}S(C_2H_4O)_6H$ | 1:1 | 9.5 | 19.5 |
| Lauric acid +5 Ethyleneoxide | $CH_3(CH_2)_{10}CO(OC_2H_4)_5OH$ | 2:1 | 6.0 | 12.4 |
| Tricontapropyleneglycol +10 Ethyleneoxide | $HO(C_2H_4O)_5(C_3H_6O)_{30}(C_2H_4O)_5H$ | 2:1 | 1.3 | 2.8 |
| Cresol +150 Ethyleneoxide | $CH_3 \cdot C_6H_4(OC_2H_4)_{150}OH$ | 4:1 | .25 | .51 |
| Cresol +60 Propyleneoxide | $CH_3 \cdot C_6H_4(OC_3H_6)_{60}OH$ | 2:1 | .84 | 1.74 |
| Nonylphenol +30 Butyleneoxide | $C_9H_{19}C_6H_4(OC_4H_8)_{30}OH$ | 2:1 | 1.3 | 2.6 |
| Dodecylcresol +50 Butyleneoxide | $C_{12}H_{25}(CH_3)C_6H_3(OC_4H_8)_{50}OH$ | 1:1 | 1.5 | 7.2 |
| Nonylphenol +10 Propyleneoxide | $C_9H_{19}C_6H_4(OC_3H_6)_{10}OH$ | 2:1 | 3.5 | 7.2 |
| Dinonylphenol +40 Propyleneoxide | $(C_9H_{19})_2C_6H_3(OC_3H_6)_{40}OH$ | 4:1 | .56 | 1.15 |
| Dodecylphenol +2 Propyleneoxide | $C_{12}H_{25}C_6H_4(OC_3H_6)_2OH$ | 3:1 | 4.7 | 9.7 |
| Tridecylalcohol +40 Butyleneoxide | $C_{13}H_{27}(OC_4H_8)_{40}OH$ | 2:1 | .98 | 2.0 |
| Stearyl alcohol +90 Propyleneoxide | $C_{18}H_{37}(OC_3H_6)_{90}OH$ | 4:1 | .28 | .58 |
| Lauryl alcohol +60 Butyleneoxide | $C_{12}H_{25}(OC_4H_8)_{60}OH$ | 2:1 | .67 | 1.39 |

As in Example 1, the products, which possess outstanding soap-like and surface active properties in aqueous solution, can be diluted with alcohol and neutralized with a salt-forming base such as caustic soda, ammonia, triethanolamine, pyridine, or mono- to tri-valent metal hydroxides to produce the corresponding neutral salts.

Instead of the nonionic surface-active intermediates employed in the foregoing examples, others can be substituted, as for instance condensation products of at least 1 and up to 150 molecular equivalents of ethyleneoxide, propyleneoxide or butyleneoxide with one molecular equivalent of butyl-, amyl-, dibutyl-, diamyl-, tripropyl-, heptyl-, octyl-, nonyl-, decyl-, undecyl-, dodecyl-, tetradecyl-, cetyl-, oleyl- and octadecylphenols and cresols, dihexyl and trihexyl phenols prepared from hexene-1 and phenol, diisoheptyl phenol, dioctyl phenol, dinonyl phenol, dioctyl paracresol, dioctyl orthocresol, didecyl phenol, didecyl paracresol, didodecyl phenol, and alkylphenols and cresols obtained by alkylation of phenol or cresol with propylene, butylene, amylene, diisobutylene, nonylene, decylene, undecylene, pentadecylene, octadecylene and mixtures thereof Further, there can be employed the condensation products of the aforesaid lower alkylene oxides with higher fatty acids constituting fatty acid mono esters of glycols and polyglycols, obtained for example by condensation of ethyleneoxide with lauric, oleic, ricinoleic, palmitic or stearic acid, or with higher fatty acids resulting from oxidation of petroleum fractions such as paraffin wax.

Alternatively, there can be employed monoethers of glycols and polyglycols resulting from condensation of the aforesaid lower alkylene oxides with alcohols obtainable by hydrogenation of the fatty acids or their glycerides present in animal or vegetable oils and waxes, eg. coconut oil, castor oil and the like, or with alcohols produced by the "Oxo" process from polyolefins of at least 7 carbon atoms (i.e. by catalytic reaction of such olefines with carbon monoxide and hydrogen to form an aldehyde which is catalytically reduced with hydrogen to a primary alcohol). Olefins yielding such alcohols are for example tripropylene, tetrapropylene, pentapropylene, diisobutylene, triisobutylene, tetraisobutylene, propyleneisobutylene and tributylene, a representative alcohol being oxotridecyl alcohol from tetrapropylene.

There can also be employed mono-thioethers of glycols and polyglycols obtained by condensing the aforesaid lower alkylene oxides with mercapto compounds such as dodecyl-, oleyl-, cetyl- or decyl-mercaptan, thiophenols, thionaphthols, benzyl mercaptan, etc. as described for example in U.S. Patent 2,205,021.

Moreover, suitable nonionic condensation products are those of the aforesaid lower alkylene oxides with carboxylic acid amides as described in U.S. Patent 2,085,706 or sulfonamides of the kind described in U.S. Patent 2,002,613. Such amides include for example coconut oil fatty acid amide, decylsulfonamide, and dodecylbenzene sulfonamide.

Additional suitable nonionic surface-active agents are those of the Pluronic type described for example in U.S. Patent 2,674,619, produced by condensation of multiple molar proportions of ethyleneoxide with a water-insoluble polyalkylene glycol obtained by polymerizing a 1,2-alkylene oxide of 3 or more carbon atoms at elevated temperatures. The insoluble polymer is rendered water-soluble by condensation with multiple proportions of ethylene oxide yielding a surface-active polyalkylene glycol containing 2 terminal hydroxyl groups. There can also be employed similar condensation products of lower alkylene oxides with other glycols such as 1,4-butanediol, hexamethyleneglycol and the like, or with alkylene-diamines of polyalkylene-polyamines such as ethylene diamine, propylene diamine, or triethylene tetramine. In the compounds resulting from condensation of lower alkylene oxides with compounds having a pair of hydroxyl or amino groups, one of the two terminal hydroxyl groups of the resultant condensation product can be blocked by reaction with an organic reagent forming an ether or ester therewith. Also suitable are condensation products of lower alkylene oxides with primary amines such as rosinamine, laurylamine and the amine obtained by catalytic hydrogenation of the amide of soya bean oil fatty acid.

In carrying out the preparation of the thiophosphoric esters in accordance with the invention, the conditions set out in the foregoing examples can be varied over a fairly wide range without modifying the nature of the reaction products. The reaction of phosphorus pentasulfide is carried out under substantially anhydrous conditions to avoid hydrolysis of the latter reagent. $P_2S_5$ is added gradually to the nonionic surfactant rather than arranging the addition in the opposite order in order to minimize side reactions which would result from an initial excess of $P_2S_5$, and to moderate the heat liberated by the reaction. The addition of $P_2S_5$ may be carried out over a period of 5 minutes to 2 hours, but is preferably effected within ½ to 1 hour.

The reaction mixture is preferably subjected to vigorous agitation to promote uniformity of the reaction. The temperature, maintained initially at 20–200° C., ordinarily attains a higher range of 40–200° C. by reason of the heat liberated during the reaction. The preferred temperature range is 80–160° C., the specific temperature being selected within any of the foregoing ranges being at least high enough to maintain the nonionic surface-active agent undergoing esterification in liquid or molten state. To insure completion of the reaction, the mixture is agitated at reaction temperature for ½ to 5 hours—preferably about 2 hours—after the addition of $P_2S_5$ is completed.

The proportion of nonionic surfactant to $P_2S_5$ ranges from 1:1 to 4:1, the mol ratio being preferably within the lower portion of this range (e.g. 1:1 to 2:1) in those cases where the nonionic surfactant has more than one esterifiable hydroxyl or thiol group as in the case of the "Pluronics" or similar condensation products of lower alkyleneoxide with glycols, polyglycols or polyamines.

The thiophosphoric ester compositions obtained in accordance with the invention contain 0.2 to 10% phosphorus, and 0.5 to 20% sulphur. The anionic surfactant compositions prepared as above can be employed as such or converted to salts in the manner disclosed in the examples. Thus, the composition can be neutralized with the selected base after dilution with 2 to 5 times its weight of a solvent such as a lower alcohol (ethanol, methanol) which can be recovered subsequently by distillation. Salts which are especially suitable when the products are to be employed in neutral to alkaline aqueous medium, are the sodium, potassium, calcium, magnesium, barium and ammonium salts or the salts of triethanol amine, pyridine and morpholine. Such salts are normally used when it is desired to maintain the alkaline to neutral character of the solution to which they are added.

While the products of the invention can be used in concentrations varying over a relatively wide range depending on the intended function of the mixture, they are generally effective as emulsifying, wetting and dispersing agents in concentration of 0.1 to 2% in aqueous solution.

They can be used alone, or formulated with conventional alkaline cleansers, builders, soaps, suspending agents, optical brighteners, stabilizers, corrosion inhibitors, solvents and the like. Moreover, they can be employed in formulating non-aqueous compositions, e.g. for use as petroleum additives for gasoline or other liquid hydrocarbon fuels, motor oils or similar lubricant compositions.

Variations and modifications which will be obvious to those skilled in the art can be made in the process and compositions hereinabove described without departing from the spirit and scope of the invention.

We claim:

1. An anionic surface-active thiophosphoric acid ester of a non-ionic surface-active condensation product of an alkylene oxide of 2 to 4 carbon atoms with an alkylphenol containing at least 11 carbon atoms, wherein the alkylene oxide radicals of said condensation product are identical, the condensation product contains in its molecule at least four such alkylene oxide radicals, the esterified non-ionic surface-active condensation product radical corresponds to 0.5 to 2 stoichiometric equivalents per atomic equivalent of phosphorus, and the weight ratio of phosphorus to sulfur is about 1:2.

2. An anionic surface-active thiophosphoric acid ester of nonylphenol-polyethylene-glycol monoether of the formula $$C_9H_{19}\text{—}C H_4(OCH_2CH_2)_9OH$$

said ester containing about 4.6% phosphorus and about 9% sulfur.

References Cited by the Examiner
UNITED STATES PATENTS

| | | | |
|---|---|---|---|
| 2,196,755 | 4/1940 | Dickey | 260—461.113 X |
| 2,344,395 | 3/1944 | Cook et al. | 260—461.113 X |
| 2,382,775 | 8/1945 | Cook et al. | 260—461.113 |
| 2,506,310 | 5/1950 | Mikeska | 260—461.113 |
| 2,579,037 | 12/1951 | Evans et al. | 260—461.113 |
| 2,591,577 | 4/1952 | McDermott | 260—461.113 X |
| 2,802,856 | 8/1957 | Norman et al. | 260—461.113 |
| 2,822,374 | 2/1958 | Vogel | 260—461.113 |
| 2,884,431 | 4/1959 | Smith et al. | 260—461.113 X |
| 2,901,311 | 8/1959 | Nusslein et al. | 260—461.313 |
| 2,905,683 | 9/1959 | Goldsmith | 260—461.113 X |
| 2,959,544 | 11/1960 | Smith et al. | 260—461.113 X |
| 3,004,056 | 10/1961 | Nunn et al. | 260—461.312 |

FOREIGN PATENTS

| | | |
|---|---|---|
| 220,805 | 3/1957 | Australia. |

CHARLES B. PARKER, *Primary Examiner.*

MORRIS LIEBMAN, *Examiner.*